Jan. 10, 1956    G. SCHWESINGER    2,730,010
AUTOMATIC FOCUSING DEVICE

Filed Nov. 2, 1951    3 Sheets-Sheet 1

INVENTOR.
GERHARD SCHWESINGER
BY
Harry M. Saragovitz
Attorney

Jan. 10, 1956  G. SCHWESINGER  2,730,010
AUTOMATIC FOCUSING DEVICE
Filed Nov. 2, 1951  3 Sheets-Sheet 2

INVENTOR.
GERHARD SCHWESINGER
BY
*Harry M. Saragovitz*
Attorney

Jan. 10, 1956  G. SCHWESINGER  2,730,010
AUTOMATIC FOCUSING DEVICE
Filed Nov. 2, 1951  3 Sheets-Sheet 3

INVENTOR.
GERHARD SCHWESINGER
BY
Harry M. Saragovitz
Attorney

United States Patent Office 2,730,010
Patented Jan. 10, 1956

2,730,010
AUTOMATIC FOCUSING DEVICE

Gerhard Schwesinger, Little Silver, N. J., assignor to the United States of America as represented by the Secretary of the Army Application November 2, 1951, Serial No. 254,620

7 Claims. (Cl. 88—24)

(Granted under Title 35, U. S. Code (1952), sec. 266)

The invention described herein may be manufactured and used by or for the Government for governmental purposes without the payment of any royalty thereon. United States Patent No. 2,704,484, to the present inventor based on similar subject matter, was filed September 8, 1951, Serial No. 245,656.

This invention relates to a focusing mechanism for automatically and continuously coordinating the relative distances between a lens, its subject and the image plane upon which the image of the subject is resolved. The mechanism also embodies an adjustment for coordinating such relative distances for lenses of different focal lengths.

The invention is particularly useful when applied to photographic apparatus such as photographic enlarging and copying devices. The use of the invention in these devices converts them into highly versatile instruments whose capabilities extend far beyond that of conventional apparatus.

In one compact apparatus embodying the invention a relatively great scope of magnification or reduction is possible of achievement. This feature is combined with automatic focusing throughout the entire range of the apparatus.

Briefly, the apparatus consists of a mechanism interconnecting two of the three elements of an optical system for producing and focusing the image of the subject. In the embodiment of the invention to be described the lens is considered the third element and is fixed in position. The mechanism employs two pairs of inter-engaging rotary cams. One cam of each pair is fixed upon a common shaft which is rotated to establish the desired enlargement or reduction ratio of the apparatus. The cams fixed upon the shaft referred to will hereinafter be called the input cams. The movement of the other cams to be designated the output cams is transmitted respectively to any two of the three named elements of the apparatus. The terms input and output relating to the cams are assumed to facilitate the description and not as a mechanical limitation. Operating force may be applied at any convenient point in the mechanism. In the embodiment to be described herein the easel or image stage and the subject stage are made the moving elements which are arranged to travel in a straight line toward and from a lens fixed in position. The travel of the subject stage and the image stage easel is confined to a straight line parallel to the lens axis.

To transmit the rotary motion of the output cams to the subject and image stages each output cam has a gear secured thereto which meshes with and drives a rack secured to an actuating member which in turn are secured respectively to the subject stage and image stage. Other means may be used to translate motion of the cams to the actuating members. The cams are designed to establish the variable ratio between the movements of the subject and image stages which follow the optical law governing the relationship between the three elements of the system to continuously maintain in-focus relationship throughout a wide range of magnification or reduction.

An important feature of the invention resides in the ability of the apparatus to utilize lenses of different focal length. By a simple adjustment of the angular relationship of the input cams the mechanism can be adjusted to function accurately in maintaining automatic focusing of the apparatus for a given series of lenses.

It is a primary object of the invention to provide a mechanism for coordinating the movements of a plurality of elements according to a mathematical pattern which movements are directly related to the characteristics of one element which is interchangeable and wherein the mechanism may be adjusted to function correctly for a substituted element having a different characteristic.

A further object of the invention is to provide a mechanism particularly adapted to automatic focusing of optical elements and in which the range of automatic focusing can be extended and adapted to lenses of different focal lengths.

A still further object of the invention is to provide an automatic focusing apparatus having means for changing its range of magnification or reduction and in which the change may be effected by an adjustment calibrated in uniform divisions such as diopters or other units.

Other objects and features of the invention will more fully appear from the following description and will be particularly pointed out in the claims.

To present a better understanding of the invention a particular embodiment thereof will be described and illustrated in the drawings wherein.

Figures 1, 2, 3:
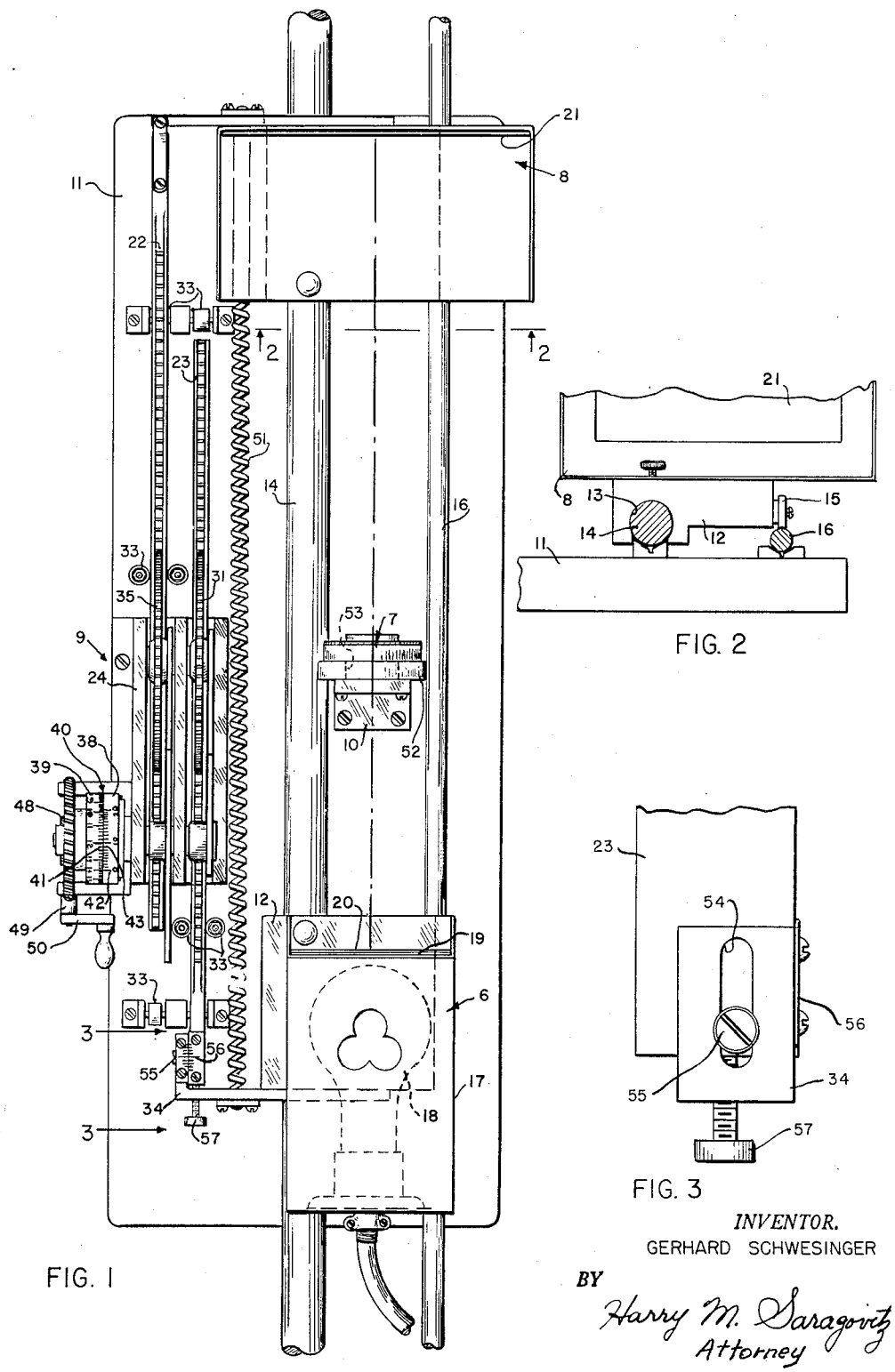
Fig. 1 is a plan view of the apparatus.
Fig. 2 is a detail cross-sectional view on line 2—2 of Fig. 1.
Fig. 3 is a detail view illustrating the means for adjusting the position of a focusing element of the apparatus independently of the focusing mechanism.
Figure 4:
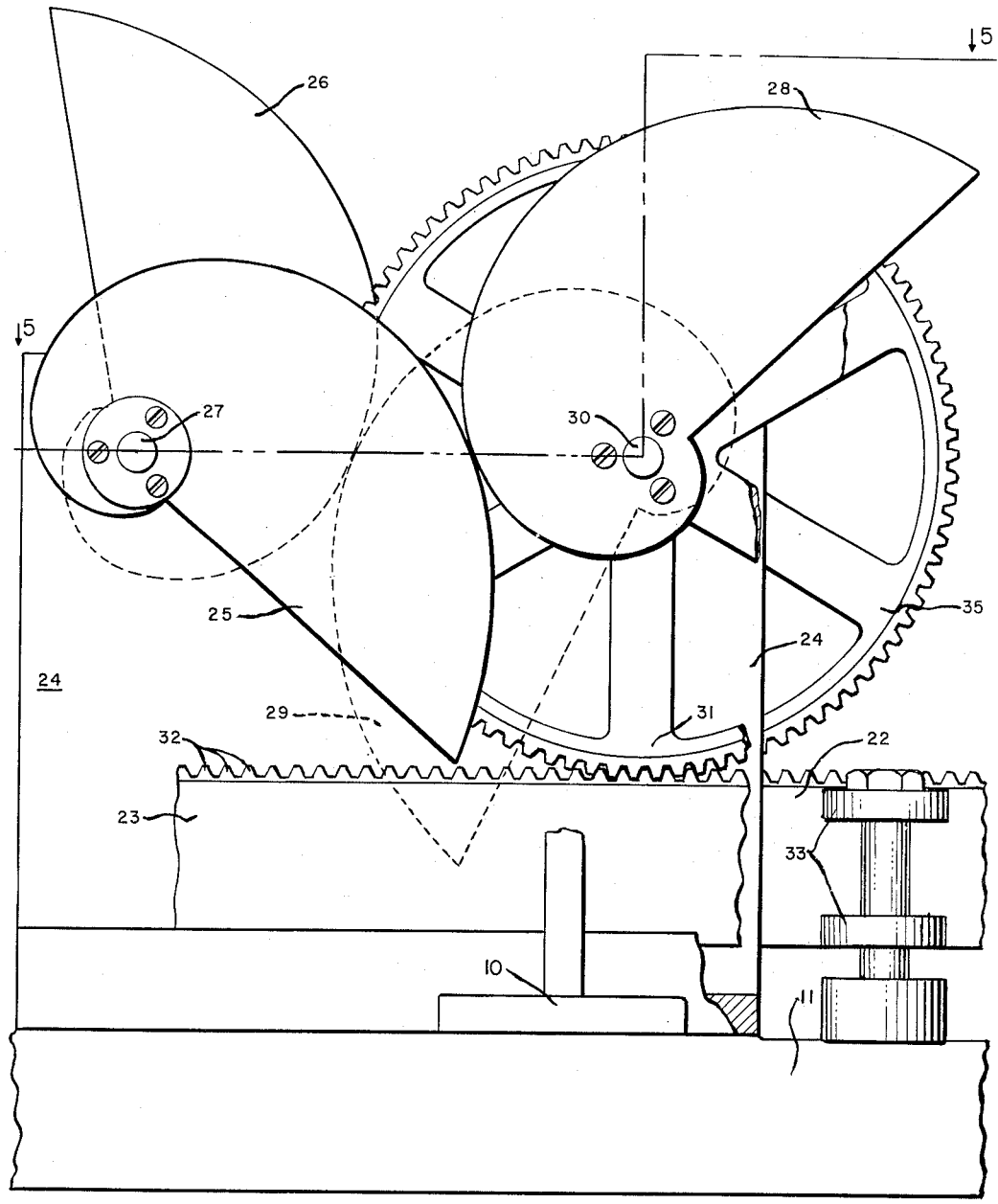
Fig. 4 is a partial side elevation of the apparatus with parts broken away.
Figure 5:
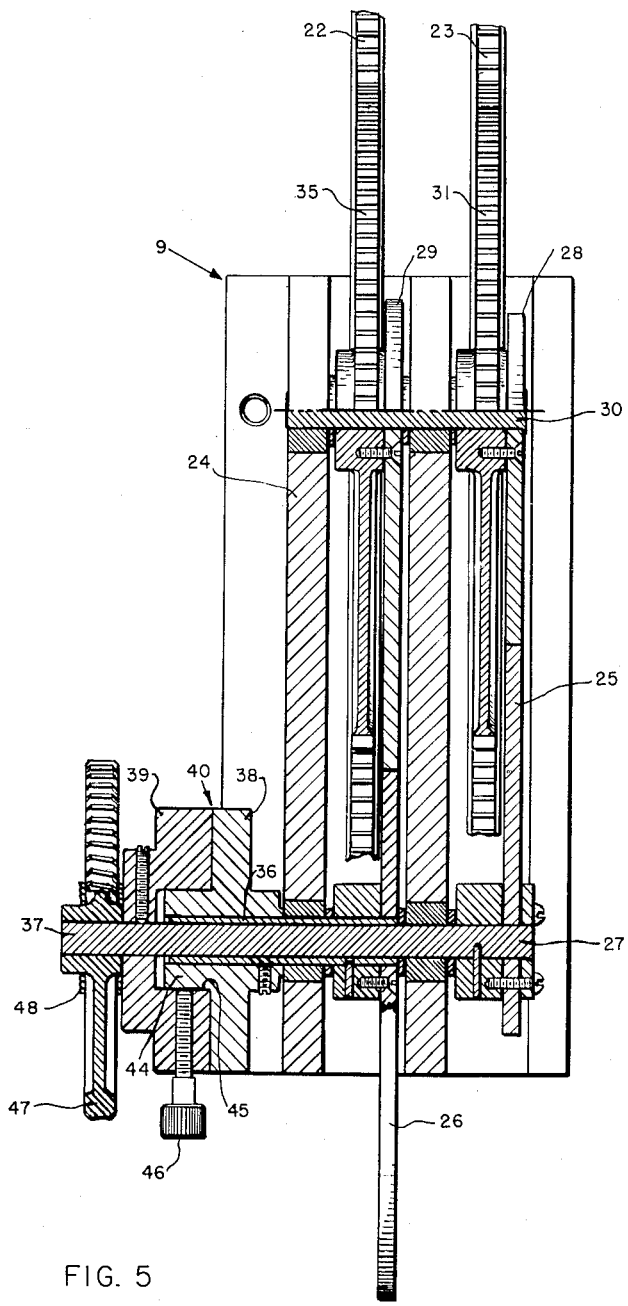
Fig. 5 is a horizontal cross-sectional view taken on line 5—5 of Fig. 4.

The present invention fulfills a long desired need for an apparatus which is accurate, universal and flexible in its application to coordinating relative movements of a plurality of elements according to a pattern such as that which is defined by a mathematical formula.

The application herein presented is that relating to the continuous automatic focusing of an optical image over a wide range of magnification or reduction.

It has been found in practice that to perform a wide variety of enlarging, reducing or copying operations two or more complete apparatus are required. The scope of operations referred to above is meant to apply where a large variety of subject sizes must be processed over a wide range of sizes. For example, it may be required to process negatives in sizes ranging from conventional miniature sizes up to 4 x 5 inches or larger.

One apparatus of conventional construction capable of performing such a wide range of work becomes large and inefficient in operation. In the present invention a single compact apparatus is capable of performing all of the required operations involving a wide range of sizes.

The apparatus is composed of four principal components, a subject holder or stage 6 containing a source of light, a lens 7, an easel or image stage 8 upon which an image of the subject is projected by the lens and a mechanism 9 for adjusting and coordinating the distances of lens to subject and lens to easel.

The lens 7 is removably secured upon a column 10 fixed to a base 11. The easel 8 and the subject stage 6 are guided to move in a straight line parallel to the axis of the lens along and upon base 11. It should be noted, however, that it is within the scope of the invention to fix the position of either the subject stage 6 or the easel 8 and arrange the remaining elements to establish focusing relationship.

Any suitable arrangement may be made to guide elements 6 and 8. As herein presented the subject stage 6 and the easel 8 are provided with similar base structures 12 each of which are provided with an aperture 13 through which a guide bar 14 extends. The bar 14 fits closely within the aperture 13 of each of the bases and is itself rigidly secured to the base 11 parallel to the axis of the lens. Desirably, the apertures 13 are situated adjacent one side of the bases while the opposite side is provided with a roller type support. Such a support may comprise an anti-friction bearing 15 the inner race of which is secured to a vertical side face of the base and whose outer race rolls upon a straight rod 16 secured to the base parallel to the rod 14.

The subject stage 6 is secured upon one of the bases 12 and is provided with a lamp housing 17 containing a diffused illuminant such as a lamp bulb 18 having a light diffusing envelope. The subject which may be a negative 19 is held in a suitable holder 20 placed near the lamp 18.

The other base serves as a support for the easel 8 which is provided with a projecting surface 21 upon which sensitive material is placed to record the image formed by the lens 7. Thus, subject stage and easel are accurately and freely guided along a path in alignment with the lens axis.

The mechanism 9 is provided with a pair of actuator bars 22 and 23, the outer ends of which are respectively connected to and act to move the easel 8 and the subject stage respectively toward and from the lens 7. The mechanism 9 engages and drives the bars 22 and 23 in a manner which will appear hereinafter. The mechanism itself is composed of a plurality of rotary cams arranged in pairs each pair constituting a motion converting system. The active faces of each pair of cams interengage in rolling contact. The contours of the face of the cams are so designed that a continuous in-focus relationship between the elements is fulfilled by the use of cams having purely rolling contact between them. It should be noted in this connection that rolling contact between the cams as contrasted to sliding friction therebetween, contributes greater efficiency and lessens wear of the mechanism.

One cam of each pair are locked together upon a driving shaft which is actuated by the operator. This pair will be called the input cams while the other cam of each pair are connected to the actuators 22 and 23 to propel members 6 and 8. These latter cams will be called the output cams.

There are various ways in which the cams may be arranged to produce the desired result. As shown herein the cams and their associated elements are received in a supporting framework 24 secured to the base 11. The two input cams 25 and 26 are secured to a shaft 27 journaled in the frame 24 while the output cams 28 and 29 are independently rotatably mounted upon a shaft 30 supported in the frame 24, spaced from the parallel to the shaft 27.

The form of the cam surfaces will first be described in general terms in connection with their mechanical function and subsequently the mathematical nature of the cam outline will be discussed.

As above stated each pair of cams is designed to possess a definite variable ratio of rotation which in turn is translated into the linear ratio existing between the elements 6 and 8 by means of a gear and rack construction. The pair of cams 25 and 28 have their active faces in contact and the cam 28 has a gear 31 secured thereto. This cam and gear combination is arranged to freely revolve upon the shaft 30. The gear 31 meshes with rack teeth 32 upon the upper edge of the actuator bar 23. The bar 23 is guided to move longitudinally of and parallel with the lens axis by a plurality of anti-friction bearings 33 which engage its side wall and bottom edge. This bar 23 is connected to the subject stage 6 by a bracket 34. Thus the degree of rotation of the cam 28 is directly proportional to the movement of the member 6.

The two cams 26 and 29 are desirably identical in form and size as are also the cams 25 and 28. The cam 26 is mounted on the shaft 27 and the cam 29 is freely rotatable upon the shaft 30. Normally, the input cams 25 and 26 are coupled together to rotate with the shape 27. The cam 29 has a gear 35 secured thereto which meshes with rack teeth upon the actuator bar 22. The bar 22 is guided longitudinally along the base 11 parallel to the lens axis in the same manner as the bar 23. The bar 22 is connected to the image stage 8 in any desirable manner to transmit its motion thereto as by a connector bar shown in Fig. 1. The movement of the easel 8 is therefore directly proportional to the angular movement of the cam 29.

As above pointed out the invention provides automatic focusing not only for a specific lens but is adjustable for automatic focusing of lenses of different power. This adjustment is obtained by adjusting the relative positions of the two input cams 25 and 26. This adjustment may be accomplished in any suitable manner and as shown herein the shaft 27 is provided with an outer sleeve shaft 36 to which the cam 26 is secured and an inner solid shaft 37 axially rotatable within the sleeve shaft and to which the cam 25 is secured.

Sections of the shaft 27 are extended outward beyond the frame 24. The extension of the sleeve section 36 is provided with an enlarged cylindrical section 38 while the section 37 is provided with a corresponding enlarged section 39. The two enlarged sections 38 and 39 are arranged with their two adjacent side faces in contact thereby to form a cylindrical dial 40. One section of the dial is provided with an accurate scale 41 while the other section has a reference mark 42 thereon which provides the means for conditioning the mechanism to function accurately in connection with a specific lens. The mathematical pattern of the cams in the mechanism is such that the dial 40 may be calibrated directly in diopters. If desired, the vernier scale 43 may be engraved upon the portion 38 thereof to provide for fine adjustment of the mechanism.

Suitable means are provided for locking the two sections of the shaft together. Any coupling means may be employed such as that shown in the drawings wherein one of the cylindrical sections is provided with a portion 44 reduced in diameter and projecting into a recess 45 in the other dial section. A locking screw 46 has threaded engagement with and extends substantially radially inward thru the outer portion of its section and projects into the recess 45 where it engages the projection 44 of the other portion of the cylindrical dial. The screw 46 is desirably provided with a thumb nut portion by means of which it may be tightened to lock the sections of the dial and the shaft 27 together. Thus, it will be seen the two sections of the shaft 27 carrying the two input cams function as a unitary structure during the operation of the device.

It will be advantageous in understanding the principles of operation of the mechanism to discuss more in detail the manner in which the mechanism 9 controls the relative position of the focusing elements of the apparatus to accomplish automatic operation. Since the operation of the device depends directly upon the design of the cams and the means for adapting the apparatus to the use of lenses of different power, the basis for their design will be presented.

The ratio of angular movement between the cams in each of the motion converting systems is made to follow the relationship which requires that the angular displacement of one of the cams is equal to the reciprocal of the angular displacement of the other.

The two pairs of cams whose curves produce the above relationships are so coordinated in the mechanism above described that the output movements derived therefrom fulfill the relationship between object distance, image distance and focal length of the lens according to the following formula:

$$\frac{1}{\text{Object distance}} + \frac{1}{\text{Image distance}} = \frac{1}{\text{Focal length}}$$

One pair of cams produces the reciprocal of the object distance while the other pair of cams produces the reciprocal of the image distance. It will be realized that displacements of the input cams or other elements referred to herein are measured from reference points set up by well known optical and mathematical laws governing reciprocal relationship. However, since these theoretical reference points correspond to the reciprocals of infinite distances the operator need know only the sum of such displacements. The interconnection between the two pairs of cams is such that the sum of the two reciprocals is constant namely $$\frac{1}{F}$$

By making the interconnection adjustable one can adapt the mechanism to various values of focal length.

There are several advantages which follow from the above related relationships. It follows that the angle of adjustment between the two converting systems is directly proportional to the change in power between a given lens and that of a lens to be substituted therefor. For this reason the adjusting device as hereinbefore mentioned may be divided into uniform divisions which may represent diopters.

Moreover of all the mechanisms which may be devised to produce the inverse relationship between the movement of the cams in each pair, the construction used herein has the distinct advantage that the two cams interengage with purely rolling contact which as above pointed out eliminates sliding friction and resulting wear. Also the cam structure eliminates self-locking of the mechanism.

The present invention permits the use of congruent cams and by proper selection of the parameters used in the design of the mechanism all four cams may be made of identical size and curvature thus simplifying their manufacture and enhancing the possibility of maximum accuracy.

It will be apparent from the foregoing description that after the apparatus has been adjusted by properly setting the dial 40 the desired degree of enlargement or reduction may be obtained by rotating the shaft 27 which moves the subject stage 6 and the easel 8 in their proper relative relationship to the lens 7 to maintain constantly accurate focusing of the image upon the focal plane 21 of the easel.

For convenience and ease of operation special means is provided for rotating the shaft 27. A worm gear 47 is rigidly secured to an extension of the shaft 27. The gear 47 is driven by a worm 48 mounted on a drive shaft 49 which is journaled in a pair of bearings rigidly fixed to the frame 24. The shaft 49 is provided with a crank handle 50 with which to rotate the worm.

The above means for rotating the shaft 27 carrying the two input cams provides a smooth and efficient means for adjusting the magnification or reducing ratio of the apparatus. The worm and gear also function as an efficient locking means to maintain the elements 6 and 8 in their adjusted position.

The contour of the cam faces permits one cam to be driven from the other when the driving cam is moving in that direction which increases its radius at the point of contact. When, however, the reverse driving relationship takes place the cam faces would normally separate. This condition is corrected by introducing a spring tension to prevent separation of the parts. This may be done in any suitable way such as that illustrated herein wherein a tension spring 51 is connected between the elements 6 and 8. The spring acts thru the bars 22 and 23 and the gears 31 and 35 to cause the cams to maintain rolling contact at all times.

It should be noted that in connection with the above mechanism the exact structure shown in the drawings is one example only of the many ways in which the principles of the invention may be utilized. In this connection it may be found more desirable to provide driving relationship between the cams in a different manner. The active faces of the cams may be provided with interengaging gear teeth. In such case the pitch line of the gear teeth would follow the outline of the cams as shown in the drawings.

By providing congruent gears instead of cams a more efficient transfer of forces thruout the mechanism is provided. As a result the forces exerted upon the shafts 27 and 30 and the bearings in which they rotate is greatly reduced.

The device is very simple in operation. For example, if one is using a lens having a power of a known number of diopters the dial 40 is set to correspond to the power of the lens by loosening the set screw 46, relatively moving the cams and tightening the screw when the dial is correctly adjusted. A subject such as a negative is placed on the subject stage 6, the projection lamp is turned on and the input shaft is rotated until the image appearing upon the easel is the desired size. The desired photographic operation may then be performed.

If the range of magnification or reduction obtainable with the lens in use is not adequate another lens of different power may be substituted which will fulfill the required condition. When such a change is made the dial 40 is readjusted to the power of the new lens and another correction is made to insure a high degree of accuracy in focusing. This additional adjustment is necessary because of a factor inherent in the construction of all lenses.

Critical focusing distances for a given lens are measured from each side of the lens from points called the "nodal" points and a fixed dimension for a given lens exists between its nodal points and this dimension varies for lenses of different design and focal length. Special means are provided to compensate for this common characteristic of lenses as follows.

In the apparatus described above each lens to be used is provided with its own between-the-lens shutter. Other means for controlling the exposures may be provided however. In addition to the shutter an adapter ring 52 is provided for each lens. Each ring has an extension which accurately fits an aperture in the support column 10 and is also provided with an aperture 53 to receive the lens.

By properly dimensioning the adapter ring for each lens one of the nodal points thereof can be placed at a common point on the optical axis of the apparatus. The other nodal points of the lenses thereof will vary in position according to the lens in use. To adjust the apparatus to function correctly for the various lenses used an adjustment must be made. This adjustment involves the shifting of one of the two moving elements 6 or 8 a known amount to coordinate the apparatus to the dimension between the nodal points of a new lens positioned in the apparatus.

The actual shifting of one of the moving elements of the apparatus may be done in any desired manner. As shown in the drawings this adjustment is provided by shifting the subject stage 6 relatively to the easel 8 independently of the mechanism 9. To do this an adjusting means is provide to lengthen or shorten the effective length of the bar 23. To do this a slot 54 is formed in the bracket thru which a locking screw 55 extends to secure the bracket to the bar. The slot 54 provides for adjusting the bracket and hence the unit 6 with respect to the bar to attain the necessary corrective factor to condition the apparatus to properly function for the nodal distance of the newly installed lens. Desirably, a vernier scale 56 is provided to indicate accurate settings of the above described adjusting means. Also an adjusting screw 57 may be provided to facilitate this procedure.

What is claimed is:

1. In an optical apparatus having a subject stage, a lens and an image stage, a mechanism for automatically focusing said apparatus comprising two positive action motion converting systems each system including two interengaging rotating members, having a fixed pattern of relatively changing ratios, one member of each system being normally coupled together and serving as input members, the other members of each system being independently freely rotatable and serving as output members, means operable to transmit motion of said output members to two of the elements of said optical apparatus and means to adjust the relative rotative position of said two input members thereby to change the output ratio pattern of the mechanism to conform to the focusing requirements of lenses of different focal length.

2. An automatic focusing mechanism according to claim 1 and wherein the movement delivered thereto is converted to displacement which is equal to the reciprocal of the displacement delivered thereto.

3. In an optical apparatus having a subject stage, a lens and an image stage, a mechanism for automatically focusing the apparatus comprising two pairs of rotary interengaging congruent cams having a fixed pattern of relatively changing ratios, one cam of each pair normally being in operatively fixed relation and serving as input members, the other cam of each pair being independently freely rotatable and serving as output members, means operable to transmit motion of said output cams to two of the elements of said optical apparatus and means to adjust the relative operative position of said input cams thereby to change the output ratio pattern of the mechanisms to function for lenses of different focal length.

4. An automatic focusing device adaptable for a plurality of lenses comprising an optical system having a subject stage, a lens, and an image stage arranged upon a common axis, a frame upon which the optical elements are mounted, means for guiding two of the optical elements linearly along said axis, an input shaft mounted in said frame, a pair of motion converting systems each comprising two interengaging motion translating members whose ratio of movement is characterized in that a first displacement of each system is inversely proportional to a second displacement thereof, the first displacements thereof corresponding to the in-focus distances between the respective nodes of the lens and each of the subject and image stages, one of the translating members of each of said systems being coupled to said input shaft, the other translating members thereof being freely rotatable on said frame, means interconnecting the independently rotatable members respectively to the two movable elements of said optical system and adjusting means to shift the relative operating positions of the translating members coupled to said input shaft thereby to establish a relationship wherein the sum of the said second displacements of said systems is inversely proportional to the focal length of a selected lens.

5. In an optical apparatus having two movable focusing members, an automatic focusing mechanism comprising a frame, two motion converting systems each system having an input member normally simultaneously rotatable in said frame, and an output member for each system freely independently rotatable in said frame, means to connect said output members to said movable focusing members, said converting systems having a fixed pattern of relatively changing ratio which acting together coordinate the image and object distances of said optical apparatus to maintain focus, an input shaft rotatably mounted in said frame having two axially rotatable sections connected respectively to said input members, means to lock said sections in any desired relative position and a calibrated dial connected to said two input shaft sections whereby the mechanism may be preset to function in a desired manner and the relative position of said input members may be noted or preset on said dial.

6. An automatic focusing device adaptable for a plurality of lenses, comprising an optical system having a subject stage, a lens, and an image stage, a pair of motion converting systems in each of which a first displacement thereof is inversely proportional to a second displacement, the first displacement corresponding to the in-focus distance between the respective nodes of the lens and each of the subject and image stages, adjustable means to maintain the sum of said second displacements of a value inversely proportional to the focal length of a selected lens, a plurality of interchangeable lenses of different focal lengths, a holder for said lenses, an adapter for each lens having positioning means thereon operable when the lens is in said holder to position one of the nodal points of each lens upon a common point along the lens axis and relatively to its respective in-focus distance, and means to independently change the other in-focus distance by an amount sufficient to reestablish the in-focus distance measured from the other nodal point of the lens thereby to maintain accurate in-focus relationship of the elements of the optical system for a selected lens.

7. An automatic focusing device adaptable for a plurality of lenses comprising an optical system having a subject stage, a replaceable lens, and an image stage, a pair of motion converting systems having input elements associated respectively with said subject and image stages, said input elements being relatively adjustable to permit setting the sum of said input element displacements from their reference positions in inverse proportion to the focal length of a selected lens used therein, said displacements in each system being in the same inverse proportion to the distance between the respective node of the lens and the stage, and means to move said input elements simultaneously to provide various lens-to-stage ratios and maintaining focus between said subject and image stages with said selected lens at all such ratios.

References Cited in the file of this patent

UNITED STATES PATENTS 2,418,230    Jacobson  ---------------- Apr. 1, 1947